United States Patent [19]
Doidge et al.

[11] Patent Number: 6,035,360
[45] Date of Patent: Mar. 7, 2000

[54] MULTI-PORT SRAM ACCESS CONTROL USING TIME DIVISION MULTIPLEXED ARBITRATION

[75] Inventors: Dennis Albert Doidge, Apex; Douglas Ray Henderson, Raleigh; Edward Hau-chun Ku; Pramod Narottambhai Patel, both of Cary; Joseph M. Rash, Wake Forest; Thomas Eric Ryle, Raleigh, all of N.C.

[73] Assignee: International Business Machines Corporation, Armonk, N.Y.

[21] Appl. No.: 08/960,382

[22] Filed: Oct. 29, 1997

[51] Int. Cl.[7] .................................................. G06F 13/00
[52] U.S. Cl. ........................................... 710/107; 709/249
[58] Field of Search ..................... 395/308, 306, 395/309, 287, 200.79; 710/107, 126, 128, 129; 709/249

[56] References Cited

U.S. PATENT DOCUMENTS 4,933,846  6/1990  Humphrey et al. .
5,471,639  11/1995  Harrington .
5,548,587  8/1996  Bailey et al. ........................ 370/60.1
5,557,783  9/1996  Oktay et al. .

*Primary Examiner*—Glenn A. Auve
*Attorney, Agent, or Firm*—Kenneth A. Seaman; Felsman, Bradley, Vaden, Gunter & Dillon

[57] ABSTRACT

A memory interface for multi-port access to a memory unit, such as a static random-access memory (SRAM) device. The memory interface, which is generally adapted for a local area network (LAN) forwarding engine, provides single port read/write access to SRAM device, and arbitrates requests from the access interfaces to allocate bandwidth of the SRAM device among the requests. One embodiment allocates at least 50% of the bandwidth to a peripheral component interface (PCI) bus target interface and a PCI bus master interface, collectively. The arbitration logic may include a plurality of bandwidth control registers associated with respective access interfaces used to determine a permitted amount of bandwidth that an access interface is to have, wherein a request from an access interface is masked based on a value in its associated bandwidth control register. Arbitration can further allocate bandwidth using time division multiplexing.

16 Claims, 7 Drawing Sheets

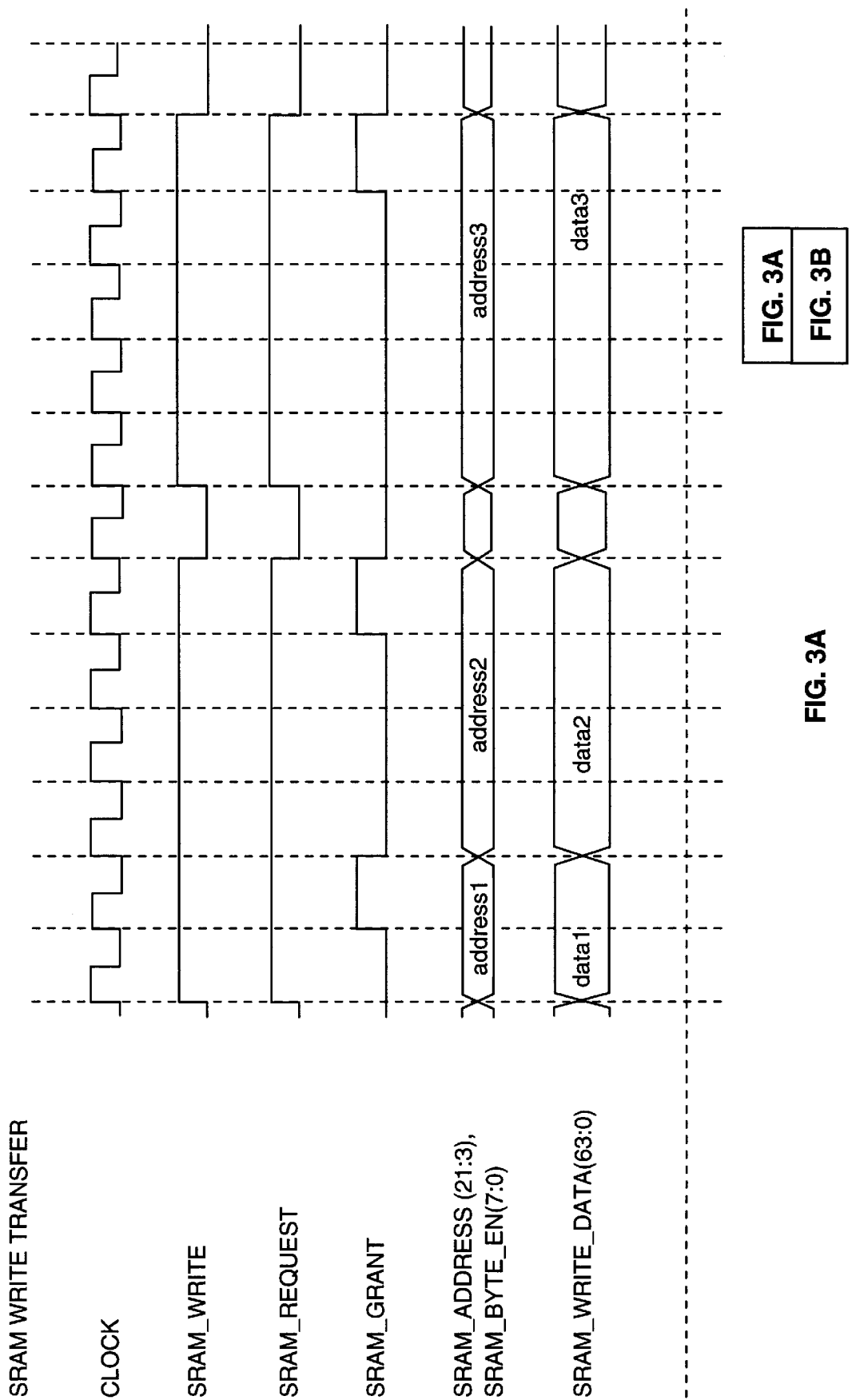

| PT/PM | UI | PT/PM | UO | PT/PM | RHW | PT/PM | THW | PT/PM | UI | PT/PM |

PT - PCI TARGET           UI - UFIC IN BUS          RHW - RECEIVE HARDWARE FORWARDING
PM - PCI MASTER           UO - UFIC OUT BUS         THW - TRANSMIT HARDWARE FORWARDING

FIG. 4

| PT/PM | UI | PT/PM | UO | PT/PM | UI | PT/PM | UO | PT/PM | UI | PT/PM |

PT - PCI TARGET           UI - UFIC IN BUS
PM - PCI MASTER           UO - UFIC OUT BUS

FIG. 5

MULTI-PORT SRAM ACCESS CONTROL USING TIME DIVISION MULTIPLEXED ARBITRATION

BACKGROUND OF THE INVENTION

1. Field of the Invention

The present invention generally relates to computer systems, and more particularly to a method of providing a multi-port connection to a memory module used by a network routing device to increase the effective bandwidth of the memory module.

2. Description of the Related Art

A wide variety of systems have been devised that allow individual computers to communicate with one another, and further allow individual "client" computers to communicate with "server" computers that provide programs and data to the clients. One very common system that links computers, usually via a wire-based cabling scheme, is referred to as a local area network (LAN). LANs not only provide a communications medium between computers, but also allow users to share peripheral devices, such as printers, data storage devices, etc. Multiple LANs which are geographically remote can be further interconnected over public or private communication lines, to create a wide area network (WAN). Switch equipment is used to connect individual computer nodes to the wire cabling (backbone) of the LAN, and to a trunk line that is used to interconnect LANs in a WAN. A bridge device can also be used to connect two separate networks (at the data link layer), to make interconnected LANs look like a single LAN.

Various transmission methods can be used to send and receive information across a LAN or WAN. An early method, referred to as token ring, uses an electronic "token" (data packet) which is passed among nodes that are interconnected in a ring or loop fashion. The sequence of nodes receiving the token corresponds to the physical order in which the nodes appear on the ring. Every node on the ring sees the data packet, but only the addressed receiving node will accept it. A more recent and widely used LAN transmission method, referred to as ethernet, is based on a bus network topology, and has several implementations. Ethernet is a baseband network, that is, a network in which the information is modulated onto a single carrier frequency. The digital input is applied directly to the transmission media without the intervention of a modulating device.

The packet of data which is sent along the network transmission medium is referred to as a frame. A frame includes address, data, frame check sequence, and control information that is switched and transmitted together. Frames must be stored in a packet buffer memory at a switch while awaiting transmission, i.e., frames from the various nodes are interleaved throughout the network. Frames can be sent in any order as the control information embedded in the frames allows the receiving end to organize them in the correct order.

The size and composition of a frame varies according to the protocol used. A network protocol is a set of rules governing the information flow within the communications infrastructure, and is also referred to as "data link control". Protocols control format, timing, error correction and running order. Multiple protocols are often used in networks, with each protocol responsible for one part of the communications function, and include internetwork packet exchange (IPX), systems network architecture (SNA), binary synchronous communications (BISYNC), or asynchronous communications (ASYNC) protocols. One technique for combining diverse data protocols is time division multiplexing (TDM). TDM provides a method of merging data from several sources into a single channel for communication over telephone lines, a microwave system or a satellite system. This single channel is divided into time slots and each transmitting device is assigned at least one of the time slots for its transmission.

Since protocols are interrelated to both the technology of the underlying data links, and the communications (hardware) requirements of the transmitting and receiving ends, protocols tend to evolve over time as technology changes. A good example of this evolution is the recent emergence of the asynchronous transfer mode (ATM) protocol which is used to provide faster digital communications. ATM is a cell-based data transfer technique in which channel demand determines packet allocation; units of data are not time related to each other. Because ATM tends to maximize the efficiency of the data communications network, it is preferable over most other prior art protocols. There is, however, a large embedded base of non-ATM networks, so various "overlay" schemes have been devised to allow ATM networks to support non-ATM protocols.

Various devices can be used to deliver packets between ATM and non-ATM networks. One such device, known as a LAN forwarding engine, is used by a LAN switch platform. The LAN forwarding engine card provides hardware forwarding between LAN switch ports and the ATM network. LAN frames which are bridged between the LAN and the ATM network are transferred using LAN emulation support. The LAN forwarding engine card also contains a processor for handling LAN frames that must be routed to the ATM network.

As shown in FIG. 1, an exemplary LAN forwarding engine is generally comprised of a universal feature interface controller (UFIC) module 10, a multiple integrated memory interface controller (MIMIC) module 12, packet memory 14, a processor subsystem 16, and an ATM adapter card 18. UFIC 10 transfers LAN frames between the LAN switch ports and packet memory 14, and provides media access control (MAC) address lookup, and performs frame forwarding and filtering using a lookup table 20. UFIC 10 is connected to the LAN switch ports via a central processing unit (CPU) bus and a frame data bus. MIMIC 12, which is a memory controller for packet memory 14, also provides hardware forwarding of LAN frames between packet memory 14 and ATM controller 18. Processor subsystem 16 handles routed LAN frames and other LAN frames which cannot be forwarded by hardware. MIMIC 12 provides multiple interfaces into packet memory 14, which is typically a static, random-access memory (RAM) array. The provision of multiple interfaces allows components such as processor 22 and ATM controller 18 to access packet memory 14 simultaneously with UFIC 10 by using a PCI (peripheral component interconnect) bus 24.

In a network router or bridge, the frame header must be evaluated and may be modified before retransmission to the network. Conventional methods of processing frames in this environment require data movement of the frames between the devices (on the LAN forwarding engine card) that process and evaluate this frame. Moving frame data across the buses is time consuming and performance limiting. The embedded processor 22 must often perform the data movement of frames, which impacts the ability of processor 22 to evaluate and process the frames. It would, therefore, be desirable to provide an efficient, high performance design for bridging and routing of frames which decreases frame movements between the devices on the LAN forwarding engine card. It would be further advantageous if the design allowed for improved utilization of the PCI bus and did not require an embedded processor to move frame data from one device to another.

SUMMARY OF THE INVENTION

It is therefore one object of the present invention to provide an improved method for forwarding frames in a multi-protocol computer network.

It is another object of the present invention to provide such a method which reduces frame movements between components on a local area network (LAN) forwarding device.

It is yet another object of the present invention to provide such a method which allows the components to access packet memory simultaneously.

The foregoing objects are achieved in a device providing multi-port access to a memory unit, generally comprising a memory interface providing single port read/write access to the memory unit, a plurality of access interfaces connected to said memory interface, and means for arbitrating requests from the access interfaces to allocate bandwidth of the memory interface among the requests. The memory unit is preferably a fast static random-access memory (SRAM) device allowing completion of a transfer within one clock cycle of the memory interface. The invention can be implemented in a forwarding engine for interconnecting a local area network (LAN) connected to an asynchronous transfer mode (ATM) network, further comprising a universal feature interface controller (UFIC) having a controller input bus interface and a controller output bus interface, and a processor subsystem having a processor having a bus target interface and a bus master interface, wherein the memory interface has a transmit hardware forwarding interface and a receive hardware forwarding interface. The arbitrating logic allocates adequate bandwidth of the memory interface to the bus target interface and the bus master interface. The arbitrating means may include a plurality of bandwidth control registers associated with respective access interfaces used to determine a permitted amount of bandwidth that an access interface is to have, and means for masking a request from an access interface based on a value in its associated bandwidth control register, such as a plurality of counters corresponding to respective access interfaces, wherein each counter is incremented for each clock cycle passing after issuance of a request from its corresponding access interface, and the request is not asserted until its corresponding counter value equals a value in its associated bandwidth control register. Arbitration can further allocate bandwidth using time division multiplexing. This approach does not require data movement between devices in the LAN forwarding engine, and avoids the use of multi-port SRAM devices which are expensive and significantly smaller in size than a single-port RAM devices.

The above as well as additional objectives, features, and advantages of the present invention will become apparent in the following detailed written description.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein:

FIG. 4 is a depiction of one example of bandwidth allocation according to the present invention;

FIG. 5 is a depiction of another example of bandwidth allocation according to the present invention;

DESCRIPTION OF THE PREFERRED EMBODIMENT

Figure 1:
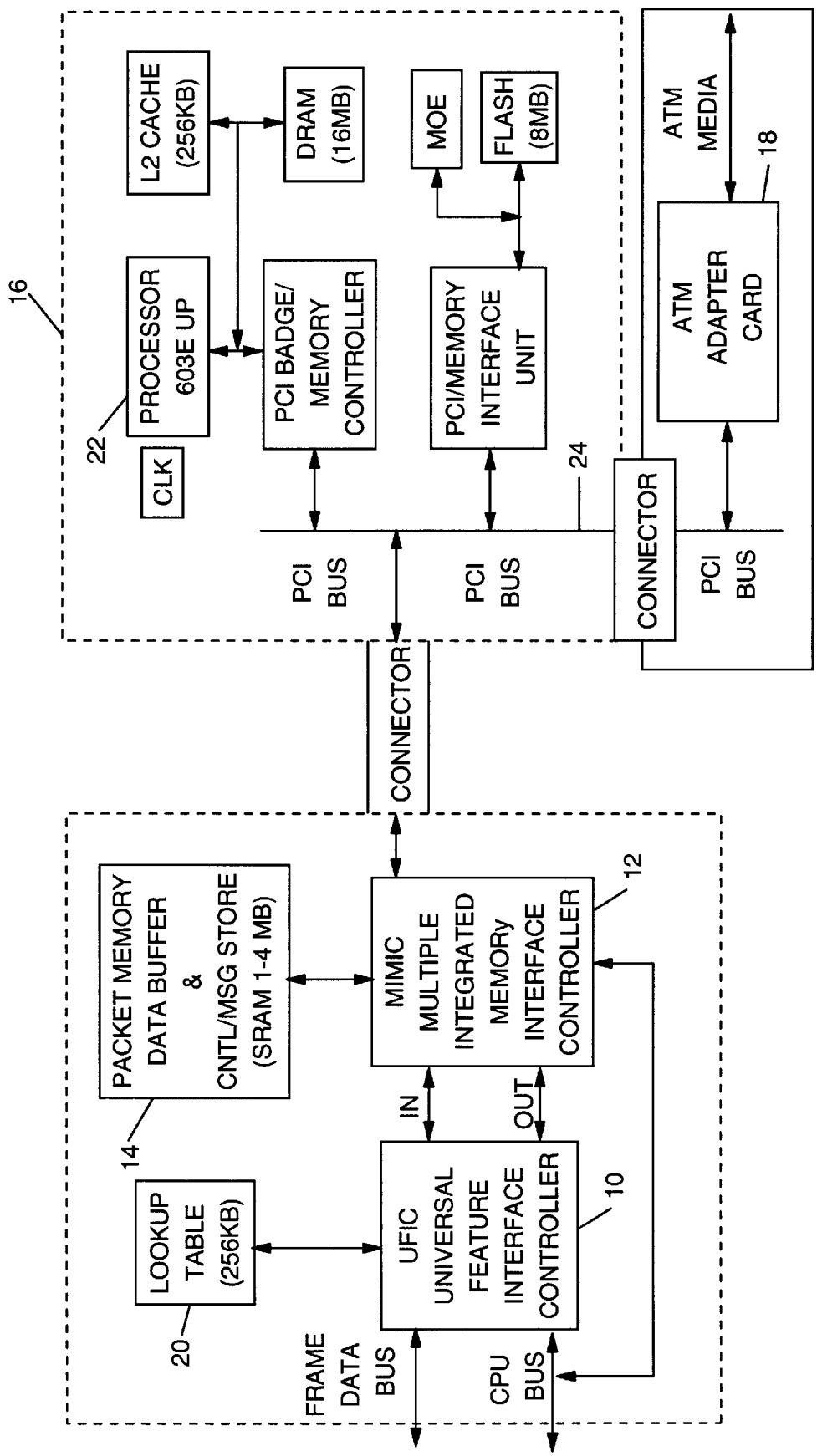
FIG. 1 is block diagram of a prior art local area network (LAN) forwarding engine.
Figure 2:
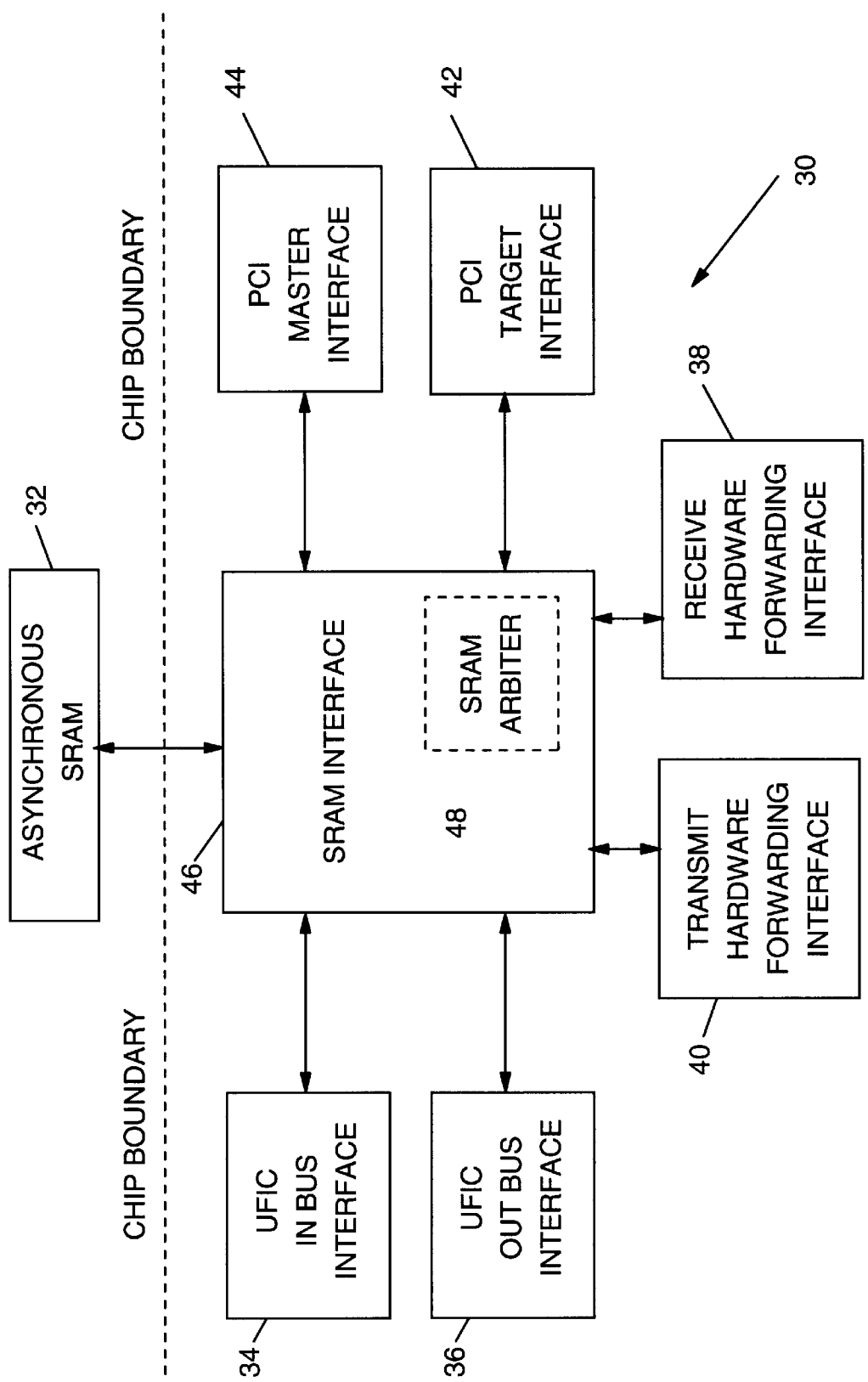
FIG. 2 is a block diagram of an integrated memory interface controller constructed in accordance with the present invention, providing multi-port connections to static random-access memory (SRAM)

With reference now to the figures, and in particular with reference to FIG. 2, there is depicted one embodiment of a multiple integrated memory interface controller (MIMIC) 30 constructed in accordance with the present invention. MIMIC 30 is adapted for use with a device, such as a local area network (LAN) forwarding engine, which transfers data packets between interconnected networks, and particularly between networks running different protocols, such as a first network using the asynchronous transfer mode (ATM) protocol and a second network using a non-ATM protocol. The LAN forwarding engine may include other components, such as those shown in FIG. 1, but the present invention may also be applied to other types of routing and bridging devices, and further to LAN forwarding engines that include non-conventional components or interconnection architectures. Therefore, while operation of MIMIC 30 may be understood with reference to FIG. 1, those skilled in the art will appreciate that the present invention is not limited to the generalized system shown in that figure.

MIMIC 30 provides multi-port connections to a memory unit or packet buffer, such as a static, random-access memory (SRAM) device 32. In the depicted embodiment, connections are provided for six different interfaces, to a universal feature interface controller (UFIC) "IN" bus interface 34, a UFIC "OUT" bus interface 36, a receive hardware forwarding interface 38 (internal to MIMIC 30), a transmit hardware forwarding interface 40 (also internal to MIMIC 30), a peripheral component interconnect (PCI) bus target interface 42, and a PCI bus master interface 44. Each interface has a dedicated port for read and write accesses to SRAM 32.

Internal logic is provided within MIMIC 30 for each of these six interfaces and for a common SRAM interface 46. The UFIC buses each require an interface to transfer frame data between packet memory 32 and a LAN switch. For hardware forwarding of frames, MIMIC 30 transfers frame data between packet memory 32 and a PCI bus as a PCI master, using PCI master interface 44. Hardware forwarding engines 38 and 40 also require access to SRAM 32 for frame processing. For software forwarding of frames, a processor transfers frame data between packet memory 32 and the PCI bus. MIMIC 30 therefore supports PCI target interface 42 for software forwarding of frames. MIMIC 30 may be constructed using an application-specific integrated circuit (ASIC).

SRAM 32 is preferably a fast asynchronous SRAM with a short access time, to allow completion of an SRAM read or write transfer in one clock cycle of MIMIC 30. For example, an access time of 15 nanoseconds (ns) allows an SRAM data transfer within a 30 ns clock period of MIMIC 30 (based on the 33 MHz clock speed). The data width of the SRAM access bus is preferably twice that of the external bus interfaces (for the UFIC buses and the PCI bus) to effectively double the bandwidth of the SRAM access bus relative to the external bus interfaces, i.e., an 8-byte data width for the SRAM access bus with a 4-byte data width for the external bus interfaces. Therefore, all 4-byte interfaces buffer eight bytes of data before requesting an SRAM access.

An SRAM arbiter 48 is provided within SRAM interface 46 to meet the bandwidth requirements of these six interfaces. The bandwidth requirements for PCI bus interfaces 42 and 44 are higher than the bandwidth requirements for the other four interfaces. The PCI bus is preferably allowed to burst data transfers in and out of SRAM 32 with no wait states. UFIC bus transfers may allow the insertion of a limited number of wait states, and the minimum burst transfer rate on the UFIC buses is preferably greater than the transfer rate of frames between the UFIC and its frame data bus. The PCI bus can operate at the LAN forwarding engine system clock frequency (e.g., 33 MHz) and can burst data each clock cycle. The UFIC buses are also banded on the system clock frequency, but can only burst data every two clock cycles. The internal hardware forwarding logic (for interfaces 38 and 40) requires only random accesses to SRAM and does not burst data. The hardware forwarding bandwidth requirements are thus considerably less than the other interfaces.

Figure 3B:
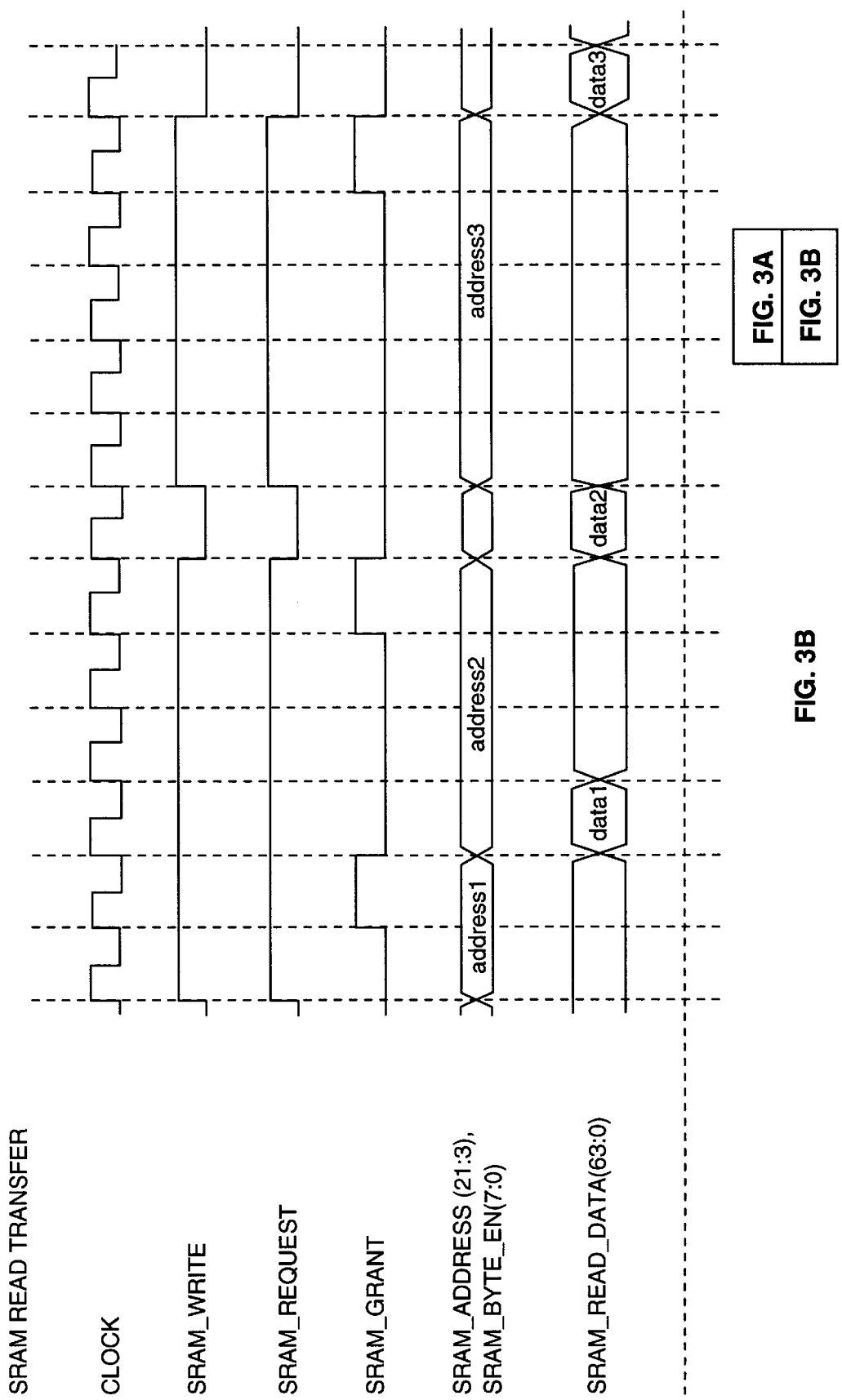
FIG. 3 is timing diagram illustrating timing signals for the SRAM interface of FIG. 2.

FIG. 3 shows the timing signals for SRAM interface 46. Each bus interface asserts a request signal which stays active until that interface receives a grant, based on the arbitration logic discussed further below. It can take only one cycle, or several cycles, for an interface to receive a grant. The grant signal is driven when the external SRAM cycle is in progress. Arbiter 48 then samples a new request from a bus interface on the cycle after the grant is driven to the first interface. Each bus interface asserts address bus signals and byte enables with its request. For write operations, eight bytes of data are driven with request. For reads, eight bytes of data are driven to the bus interface on the cycle after the grant is driven.

A time division multiplexing (TDM) arbitration scheme is preferably used for the SRAM arbitration logic. SRAM arbiter 48 is advantageously architected such that the PCI interface has SRAM bandwidth equivalent to 100% of the PCI bandwidth, consistent with the foregoing discussion regarding the data widths of the access buses. The PCI bus interfaces are preferably guaranteed half (50%) of the SRAM access bus bandwidth. The other half of the SRAM access bus bandwidth is allocated among the non-PCI interfaces using a "round robin" arbitration scheme, i.e., to ensure adequate bandwidth for all remaining devices sharing the SRAM access bus.

This TDM arbitration scheme may be understood with reference to FIGS. 4 and 5 which depict exemplary bandwidth allocations. FIG. 4 shows the bandwidth allocated to UFIC "IN" bus 34 when all four non-PCI entities are requesting access to SRAM 32 along with the PCI subsystem. In this example, the UFIC "IN" bus will be able to perform SRAM accesses on every eighth cycle. FIG. 5 shows the bandwidth allocated to the UFIC "IN" bus when two non-PCI entities are requesting access to SRAM 32 along with the PCI subsystem. In this example, the UFIC "IN" bus will be able to perform SRAM accesses on every fourth cycle.

Figure 6:
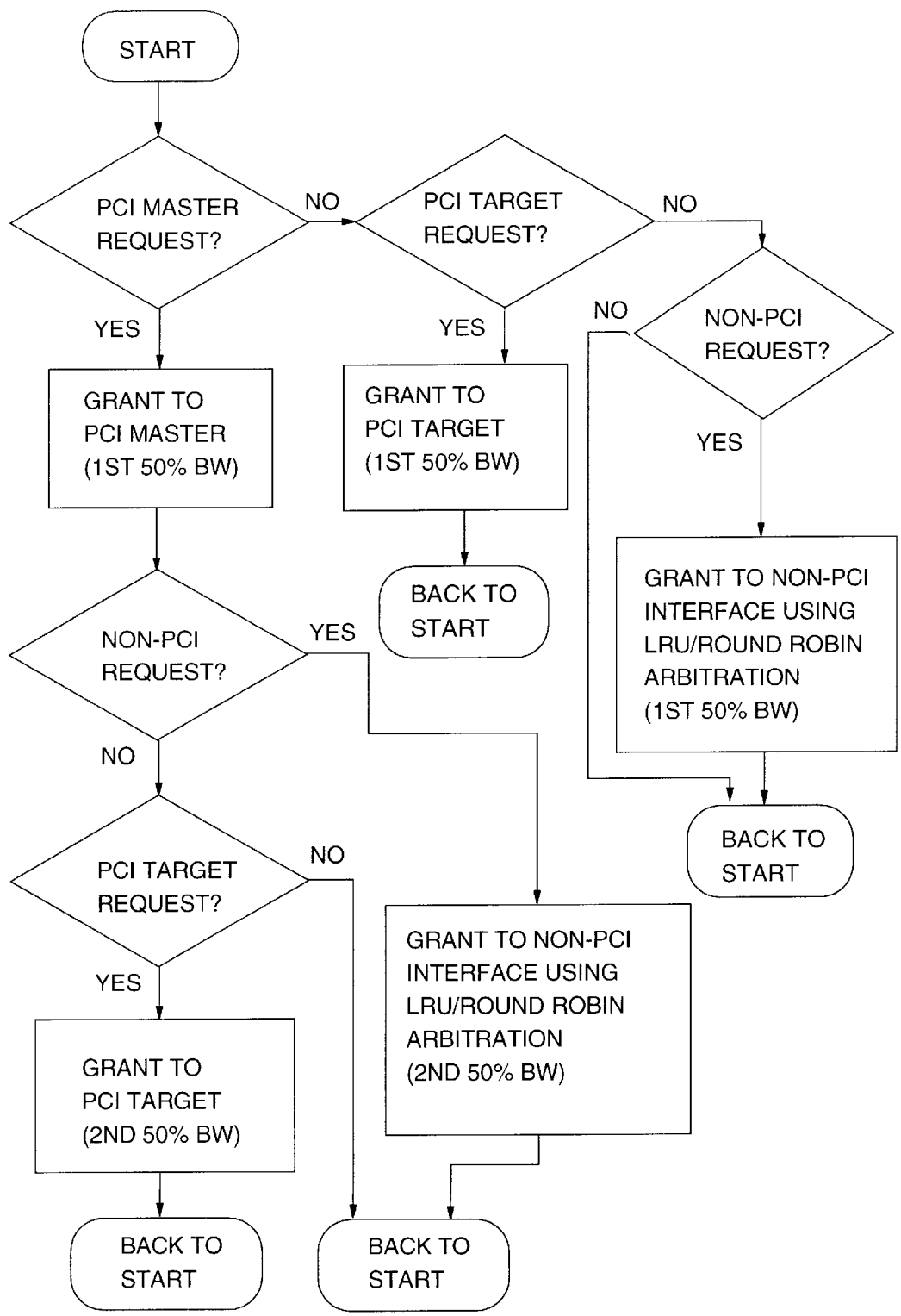
FIG. 6 is a chart illustrating the logic flow for one embodiment of an SRAM arbiter according to the present invention.

The arbitration logic can be further understood with reference to the flow chart of FIG. 6. PCI master interface 44 and PCI target interface 42 share the 50% bandwidth. PCI master interface 44 is preferably assigned a higher priority than PCI target interface 42. Thus, PCI master interface 44 will always be granted the SRAM access bus on the cycle after it issues a request, and PCI target interface 42 will be granted the SRAM access bus on the cycle it issues a request unless PCI master interface 44 is also requesting access. If PCI master interface 44 and PCI target interface 42 are both requesting SRAM access, then PCI target interface can use the other 50% bandwidth allocation if the four non-PCI interfaces are not requesting access. Whenever both PCI interfaces are not requesting access, 100% of the available bandwidth is allocated between the non-PCI requesting entities. By this method the available SRAM bandwidth is always utilized efficiently, which improves overall system performance.

SRAM arbiter 48 distributes the bandwidth among the four non-PCI requesting entities with a round robin arbitration scheme that uses a least recently used (LRU) algorithm for determining the priority of the requesting entities. Arbiter 48 maintains a priority list of the four non-PCI requesting entities to determine which requesting entity receives a grant. The priority list is updated whenever a new grant is given to a requesting entity, by placing the entity which is given the grant at the bottom of the priority list. If only one entity is requesting an SRAM access, then that entity is granted regardless of the current priority. If more than one entity is requesting access, then the entity that receives grant is the entity having the highest priority in the list. Table 1 shows several examples of how the arbitration scheme works, with up to four requesting entities A, B, C, and D:

TABLE 1

| Requesting Entities | Current Order of Priority Highest . . . Lowest | Next Grant Given to Entity | Next Order of Priority Highest . . . Lowest |
|---|---|---|---|
| A, B, C, D | A->B->C->D | A | B->C->D->A |
| C, D, A | B->C->D->A | C | B->D->A->C |
| C | B->D->A->C | C | B->D->A->C |
| A, C | B->D->A->C | A | B->D->C->A |
| B, D | B->D->A->C | B | D->C->A->B |

Another feature of the round robin arbitration scheme implemented in the present invention is the use of a bandwidth control mechanism. Each of the four non-PCI requesting entities is provided with a bandwidth control register. The bandwidth control register determines the amount of bandwidth that a requesting entity is permitted to have relative to other requesting entities. If the value in a bandwidth control register for one requesting entity is higher than the values in the bandwidth control registers of the other requesting entities, then the former requesting entity will have less allocated bandwidth with respect to the other requesting entities.

Figure 7:
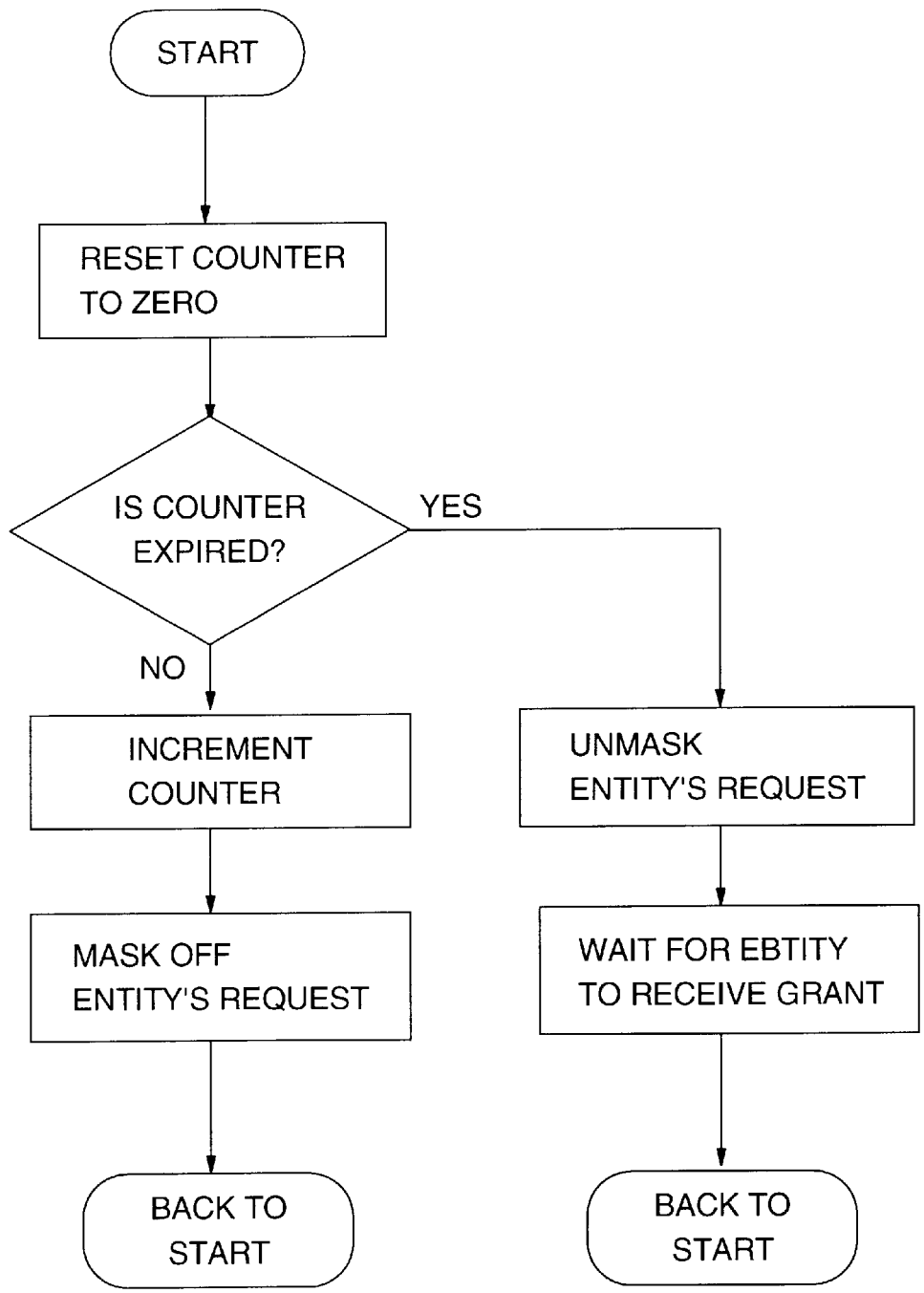
FIG. 7 is a chart illustrating the logic flow for one embodiment of a bandwidth control mechanism according to the present invention.

The bandwidth control register for a requesting entity is used to mask that entity's request for a number of clock cycles (corresponding to the value in the register) after the entity has completed an SRAM access. Each non-PCI requesting entity has a corresponding counter in SRAM arbiter 48 which is initialized to zero. Whenever one of the non-PCI requesting entities is given a grant, arbiter 48 increments the corresponding counter by one for each internal clock cycle that passes after issuance of the request. The entity's request will be masked off until the counter value equals the value in its bandwidth control register, at which time the counter expires, and the entity can then assert the request until it receives a grant. The counter will not be reset to zero and start counting again until the entity receives the grant. The flow chart of FIG. 7 shows the operation of the bandwidth control for a requesting entity.

The bandwidth control mechanism is limited if all of the bandwidth control registers are programmed with non-zero values. This condition can cause arbitration slots where all of the requests are masked off because the corresponding counters have not expired. To handle this condition, the logic can allow all of the non-PCI requesting entities to arbitrate if all counters have not expired. In this case, masking of the requests is disabled, but the round robin arbitration is not affected. The operation of the bandwidth control mechanism can also be disabled by setting the bandwidth control register values to zero.

The present invention possesses several advantages over prior art methods for handling accesses to packet memory. In particular, this solution does not require data movement between devices in the LAN forwarding engine, which improves system performance. An embedded processor is no longer needed to move frame data from one device to another. The shared memory implementation further avoids the use of multi-port SRAM devices which are expensive and significantly smaller in size than a single-port RAM device. Multi-port RAMs further lack the ability to provide data coherence among the accessing devices (i.e., to ensure that modifications to each individual memory location are serialized so as to avoid one device reading a "stale" value from memory).

Although the invention has been described with reference to specific embodiments, this description is not meant to be construed in a limiting sense. Various modifications of the disclosed embodiment, as well as alternative embodiments of the invention, will become apparent to persons skilled in the art upon reference to the description of the invention. It is therefore contemplated that such modifications can be made without departing from the spirit or scope of the present invention as defined in the appended claims.

We claim:

1. A forwarding engine for transferring data packets among a plurality of networks, comprising:
    a universal feature interface controller (UFIC) having a controller input bus interface and a controller output bus interface;
    a processor subsystem having a processor having a bus target interface and a bus master interface;
    a random-access memory (RAM) device;
    a memory interface providing single port read/write access to said RAM device, and having a transmit hardware forwarding interface and a receive hardware forwarding interface; and
    means for arbitrating requests from said controller input bus, controller output bus, bus target, bus master, transmit hardware forwarding and receive hardware forwarding interfaces to allocate bandwidth of said memory interface among said requests.

2. The forwarding engine of claim 1 wherein said arbitrating means uses time division multiplexing to allocate said bandwidth of said memory interface between at least two of said requests.

3. The forwarding engine of claim 1 wherein said arbitrating means allocates at least 50% of said bandwidth of said memory interface to said bus target interface and said bus master interface, collectively.

4. The forwarding engine of claim 3 wherein said arbitrating means uses time division multiplexing to allocate said bandwidth of said memory interface between said requests.

5. The forwarding engine of claim 1 wherein said arbitrating means includes:
    a plurality of bandwidth control registers associated with respective ones of said interfaces used to determine a permitted amount of bandwidth that an interface is to have; and
    means for masking a request from a given one of said interfaces based on a value in its associated bandwidth control register, including a plurality of counters corresponding to respective access interfaces, wherein each counter is incremented for each clock cycle passing after issuance of a request from its corresponding access interface, and the request is not asserted until its corresponding counter value equals a value in its associated bandwidth control register.

6. The forwarding engine of claim 1 wherein said RAM device is sufficiently fast to allow completion of a transfer within one clock cycle of said memory interface.

7. A computer system using the forwarding engine of claim 1, and further comprising:
    a local area network (LAN) connected to said UFIC; and
    an asynchronous transfer mode (ATM) network connected to said processor subsystem, wherein the forwarding engine transfers data packets between said LAN and said ATM network.

8. A device for providing multi-port access to a memory unit, comprising:
    a memory interface providing single port read/write access to the memory unit;
    a plurality of access interfaces connected to said memory interface wherein said access interfaces at least include a controller input bus interface; a controller output bus interface; a receive hardware forwarding interface; a transmit hardware forwarding interface; a bus target interface; and a bus master interface; and
    means for arbitrating requests from said access interfaces to allocate bandwidth of said memory interface among said requests.

9. The device of claim 8 further comprising logic means for:
    transferring frame data between said memory interface and said controller input bus interface;
    transferring frame data between said memory interface and said controller output bus interface;
    forwarding frame data from said receive hardware forwarding interface to said memory interface;
    forwarding frame data from said memory interface to said transmit hardware forwarding interface;
    forwarding frame data from said memory interface to said bus target interface; and
    forwarding frame data from said bus master interface to said memory interface.

10. A device for providing multi-port access to a memory unit comprising:
    a memory interface providing single port read/write access to the memory unit;
    a plurality of access interfaces connected to said memory interface; and means for arbitrating requests from said access interfaces to allocate bandwidth of said memory interface among said requests, wherein said arbitrating means includes:
a plurality of bandwidth control registers associated with respective access interfaces used to determine a permitted amount of bandwidth that an access interface is to have; and
means for masking a request from an access interface based on a value in its associated bandwidth control register.

11. The device of claim 10 wherein said arbitrating means further includes a plurality of counters corresponding to respective access interfaces, wherein each counter is incremented for each clock cycle passing after issuance of a request from its corresponding access interface, and the request is not asserted until its corresponding counter value equals a value in its associated bandwidth control register.

12. A forwarding engine for transferring data packets among a plurality of networks using a device for providing multi-port access to a memory unit including a memory interface providing single port read/write access to the memory unit; a plurality of access interfaces connected to said memory interface; and means for arbitrating requests from said access interfaces to allocate bandwidth of said memory interfaces among said requests, wherein the forwarding engine further comprising a random-access memory (RAM) device connected to said memory interface, said RAM device being sufficiently fast to allow completion of a transfer within one clock cycle of the device for providing multi-port access to a memory unit.

13. A device for providing multi-port access to a memory unit comprising:
a memory interface providing single port read/write access to the memory unit;
a plurality of access interfaces connected to said memory interface;
a means for arbitrating requests from said access interfaces to allocate bandwidths of said memory interface among said requests using a round robin arbitration scheme, wherein said arbitrating scheme further includes means for allocating said bandwidth of said memory interface using time division mutiplexing.

14. A method of providing a multi-port connection to a memory module used to transfer data packets among a plurality of networks, comprising the steps of:
connecting a memory interface to a random-access memory (RAM) device, the memory interface providing single port read/write access to the RAM device;
connecting a plurality of access interfaces to arbitration logic of the memory interface; and
arbitrating requests from the access interfaces to allocate bandwidth of the memory interface among the requests, including the step of allocating the bandwidth of the memory interface using time division mulitplexing.

15. A method of providing a multi-port connection to a memory module used to transfer data packets among a plurality of networks, comprising the steps of:
connecting a memory interface to a random-access memory (RAM) device, the memory providing single port read/write access to RAM device;
connecting to arbitration logic of the memory interface a plurality of access interfaces with a plurality of bandwidth control registers associated with respective access interfaces to determine a permitted amount of bandwidth that an access interface is to have; and
arbitrating requests from the access interface to allocate bandwidth if the memory interface among the requests, where said arbitrating step includes the step of masking a request from a given access interface based on value in its associated bandwidth control register.

16. A method of providing a multi-port connection to a memory module used to transfer data packets among a plurality of networks comprising the steps of:
connecting a memory interface to a random access memory (RAM) device, the memory interface providing single port read/write access to the RAM device connecting a plurality of access interfaces to arbitration logic of the memory interface, the access interfaces including:
a transmit hardware forwarding interface and a receive hardware forwarding interface associated with the memory interface,
a controller input bus interface and a controller output bus interface connected to a universal feature interface controller, and
a bus target interface and a bus master interface connected to a processor subsystem; and
arbitrating requests from the access interfaces to allocate bandwidth of the memory interface among the requests, allocating at least 50% of the bandwidth of the memory interface to the bus target interface and the bus master interface, collectively.

* * * * *